(12) United States Patent
Murano

(10) Patent No.: US 7,059,895 B2
(45) Date of Patent: Jun. 13, 2006

(54) WORK STATION OUTLET FOR BEHIND-THE-WALL CABLE MANAGEMENT

(75) Inventor: Adam Murano, West Chesterfield, NH (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 10/948,941

(22) Filed: Sep. 24, 2004

(65) Prior Publication Data

US 2006/0068633 A1   Mar. 30, 2006

(51) Int. Cl.
*H01R 13/72* (2006.01)
(52) U.S. Cl. ..................... 439/501; 385/135
(58) Field of Classification Search ............ 439/501, 439/4, 131; 385/134–135; 206/308.1
See application file for complete search history.

(56) References Cited

U.S. PATENT DOCUMENTS

| | | | |
|---|---|---|---|
| 4,778,228 A * | 10/1988 | Ackeret | 312/9.43 |
| 5,559,922 A | 9/1996 | Arnett | 385/135 |
| 5,638,481 A * | 6/1997 | Arnett | 385/135 |
| 5,659,650 A | 8/1997 | Arnett | 385/135 |
| 5,761,368 A | 6/1998 | Arnett et al. | 385/134 |
| 6,243,526 B1 | 6/2001 | Garibay et al. | 385/135 |
| 6,301,424 B1 * | 10/2001 | Hwang | 385/135 |
| 6,748,154 B1 * | 6/2004 | Patel et al. | 385/135 |

* cited by examiner

Primary Examiner—Michael C. Zarroli
(74) Attorney, Agent, or Firm—McCarter & English, LLP

(57) ABSTRACT

A work station outlet is provided that is configured to be mounted to a wall or like structure. The work station outlet facilitates cable management functions, enhances space utilization at and around the work station outlet relative to the wall during cable installation and any subsequent cable additions or alterations, and allows for effective, convenient and efficient cable access as desired. The work station outlet includes a first plate suitable for being mounted or connected to the wall. The first plate has at least one connector access opening and one or more guide structures. The guide structures are offset from the access opening and suitable to accommodate a second plate having at least one cable accommodating spool operatively associated therewith. The second plate operatively cooperates with the guide structures so as to slide, then pivot, relative to the first plate so as to advantageously provide a drawer feature allowing ready access to the spool and thereby enable efficient cable installation from the front side of the wall.

32 Claims, 7 Drawing Sheets

WORK STATION OUTLET FOR BEHIND-THE-WALL CABLE MANAGEMENT

BACKGROUND OF THE DISCLOSURE

1. Technical Field

The present disclosure relates generally to cable management equipment. More particularly, the present disclosure relates to connecting assemblies such as work station outlets for accommodating adapters/receptacles and the like suitable for connecting various electrical and cable communication lines. Still more particularly, the present disclosure relates to a work station outlet for behind-the-wall cable/equipment installations and/or management.

2. Discussion of Background Art

Cable management is extremely important in industries like the telecommunication industry where effective cable management can enhance signal transmission quality, protect connection regions from impact related damage, and prevent contamination. Communication transmission media, such as fiber optic cables and the like, are often operatively connected to work station outlets mounted to a wall and suitable to accommodate one or more receptacles operatively association with a face plate arranged at the front of the wall for receiving one or more connector jacks or the like. Optical fiber cables typically require extreme care in handling, connecting, positioning, and storing. For instance, optical fiber cables cannot be wound or bent to a radius less than a prescribed minimum bend radius without the occurrence of microcracks. There is thus a need for slack in the optical fiber cables so as to allow for effective handling and routing without incurring too sharp bends in the cable. Hence, any mounting for optical fiber cable must be capable of meeting at least these and other constraints, which can be a significant challenge in behind-the-wall applications where space is at a premium. These constraints have tended to deter efforts to develop behind-the-wall work station outlets having a flush mounting arrangement suitable for both electrical and optical fiber couplings. It is thus desirable to provide work station outlets that not only assist various wire/cable connection types, but also facilitate optical fiber cables being guided, supported and/or otherwise managed in a manner preventing undesirable bending, eliminating loose cable sags and preventing snags or twists, thereby decreasing the risk of damage to such optical fiber cables.

Despite efforts to date (See, for example, U.S. Pat. Nos. 5,559,922, 5,659,650, 5,761,368, and 6,243,526), a need remains for improved cable management equipment suitable to more effectively address the above-noted requirements associated with the handling of optical fiber cable and the like. More particularly, there is a need for improved work station outlet designs that facilitate cable management functions, provide for more efficient behind-the-wall cable installations, and enhance space utilization at or around the work station outlet.

SUMMARY OF THE DISCLOSURE

One aspect of the present disclosure is directed to a work station outlet that is configured to be mounted to a wall, facilitating cable management functions, providing for more efficient cable installations, and enhancing space utilization at and around the work station outlet. The work station outlet of the present disclosure is well suited for behind-the-wall cable installations/management and includes a first plate suitable for being mounted or connected to a wall. The first plate has at least one connector access opening and one or more guide structures. The guide structures are offset from the access opening and suitable to accommodate a second plate having at least one cable accommodating spool operatively associated therewith. The second plate operatively cooperates with the guide structures so as to both slide and pivot relative to the first plate thereby advantageously providing a drawer feature allowing ready access to the cable and/or spool and enabling efficient cable installation/management from the front side of the wall.

According to an aspect of the present disclosure, the first plate is formed so as to define a mounting face that includes mounting features for facilitating mounting of the first plate relative to a standard sheet rock or similar wall. Such mounting features typically take the form of slots and/or apertures, although alternative mounting features may be employed. The first plate also, as noted above, advantageously includes or defines at least one opening suitable to accommodate one or more receptacles adapted to operatively connect with one or more cable couplers.

According to another aspect of the present disclosure, the spool is operatively associated with the second plate so as to be vertically, oriented and the second plate is operatively associated with the first plate so as to slide along a vertical plane between at least two positions relative to the first plate. The second plate, when at a predefined position with respect to the first plate, is advantageously able to pivot about a vertical axis through a predefined angle relative to the first plate to thereby provide a third hand for assisting in cable installations.

Accessory elements advantageously may be provided according to exemplary implementations of the disclosed work station outlet. Thus, for example, an outlet cover may be operatively associated with the first plate and the second plate to add aesthetic and/or functional features to the work station outlet. As will be apparent to persons skilled in the art, the outlet cover can be used to accommodate identification icons or labels facilitating effective cable management (e.g., initial cable coupling, subsequent cable coupling, modifications to existing cable coupling arrangements). Additionally, a cable tie point may be operatively associated with the work station outlet so as to allow a fiber optic cable or the like to be strain relieved as appropriate.

In another aspect of the present disclosure, a third plate suitable for being both slidably and pivotably mounted with respect to the first plate via the guide structures is provided so as to cooperate with the second plate to provide a dual-drawer feature allowing efficient access to one or more spools operatively associated with at least one of the second and third plates. In this aspect of the present disclosure, the second plate and the third plate each may independently slide along distinct, substantially parallel and laterally spaced vertical planes as well as independently pivot about distinct, substantially parallel and laterally spaced vertical axes.

In use, the work station outlet of the present disclosure facilitates cable management functions, while enhancing space utilization at and around the work station outlet when mounted to a wall. The work station outlet facilitates cable routing and behind-the-wall cable installations. The advantageous design of the presently disclosed work station outlet as well as the enhanced functionalities stemming therefrom permit optical fiber cables to be guided, supported, stored and/or otherwise managed while simultaneously preventing undesirable bending, eliminating loose cable sags and preventing snags or twists. Moreover, the work station outlet design of the present disclosure also facilitates effectively and efficiently accessing and/or manipulating optical fiber cables or the like operatively associated with such work station outlet as desired.

By utilizing the work station outlet of the present disclosure to recess optical fiber cables relative to a wall, certain advantages may be realized, such as, for instance, a reduced area in front of the wall that is effected during cable management installation and/or subsequent cable additions or alterations, an enhanced cable functionality within the optical fiber cables by positioning and/or orienting cable accommodating structures (e.g., spools) more effectively within the work station outlet, a reduced likelihood of cable damage, and a cleaner, more aesthetic overall appearance with respect to the front of the wall.

Additional advantageous features and functions associated with the disclosed work station outlet and connecting system will be readily apparent from the detailed description which follows, particularly when reviewed together with the drawings appended hereto.

BRIEF DESCRIPTION OF THE FIGURES

So that those having skill in the art to which the subject matter of the present disclosure appertains will have a better understanding of uses and implementations of the disclosed angled patch panel and angled patch panel assemblies, reference is made to the accompanying figures wherein.

DETAILED DESCRIPTION OF EXEMPLARY EMBODIMENT(S)

The present disclosure provides for an advantageous work station outlet configured to be mounted to a wall, to facilitate cable management functions, to enhance space utilization at and around the mounted work station outlet, and to allow efficient and effective cable installation and/or subsequent cable access from the front of the wall. The work station outlet of the present disclosure may be sized, shaped and/or configured so as to accomplish any of a variety of communication transmission media connections as will be apparent to persons skilled in the art.

Figure 1:
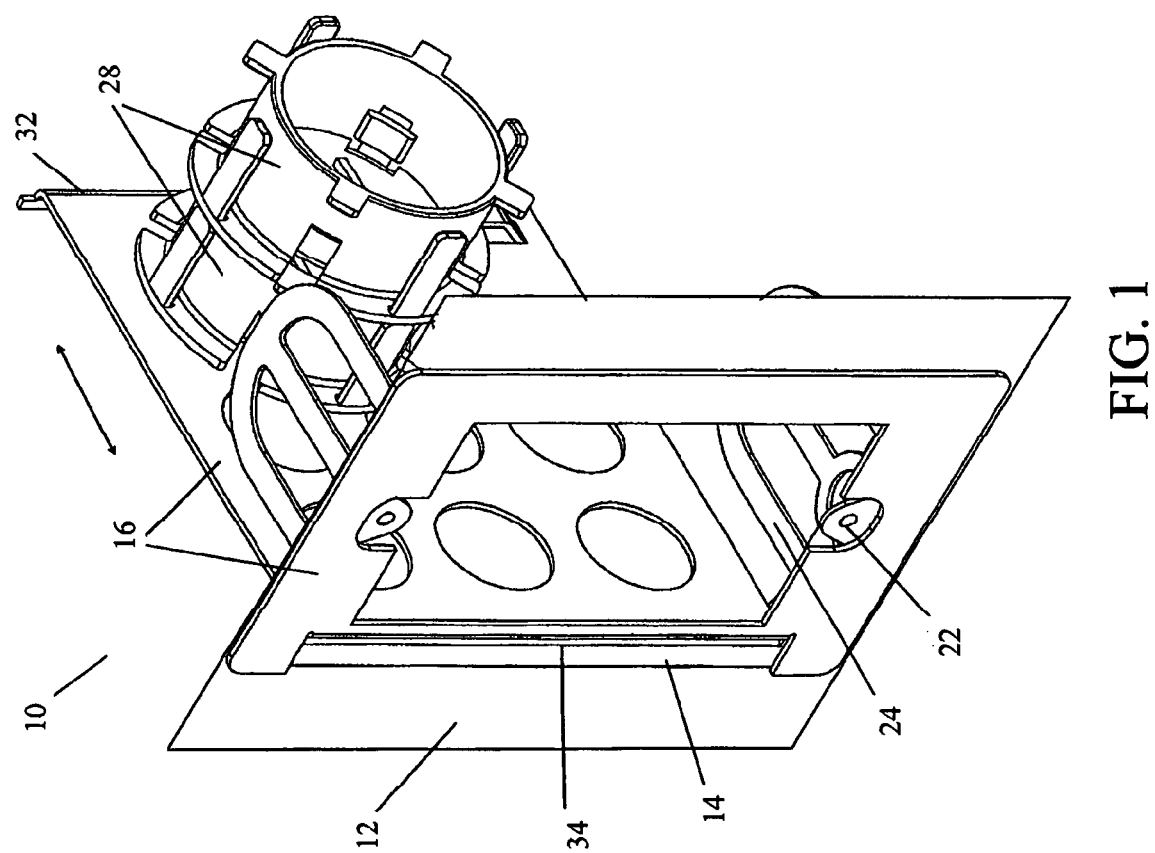
FIG. 1 is a perspective schematic view showing an exemplary work station outlet in a first illustrative position according to an aspect the present disclosure.

With reference to FIG. 1, an exemplary work station outlet 10 according to the present disclosure is schematically depicted. The work station outlet 10, as shown, is configured for mounting to a wall 12, such that the work station outlet 10 is substantially accommodated at the rear side of the wall 12. The work station outlet 10 includes a first plate 14 and a second plate 16 that are operatively connected to each other with the first plate 14 being suitable for mounting to the wall 12 and the second plate 16 being suitable to both slide and pivot with respect to the first plate 14.

Figure 2:
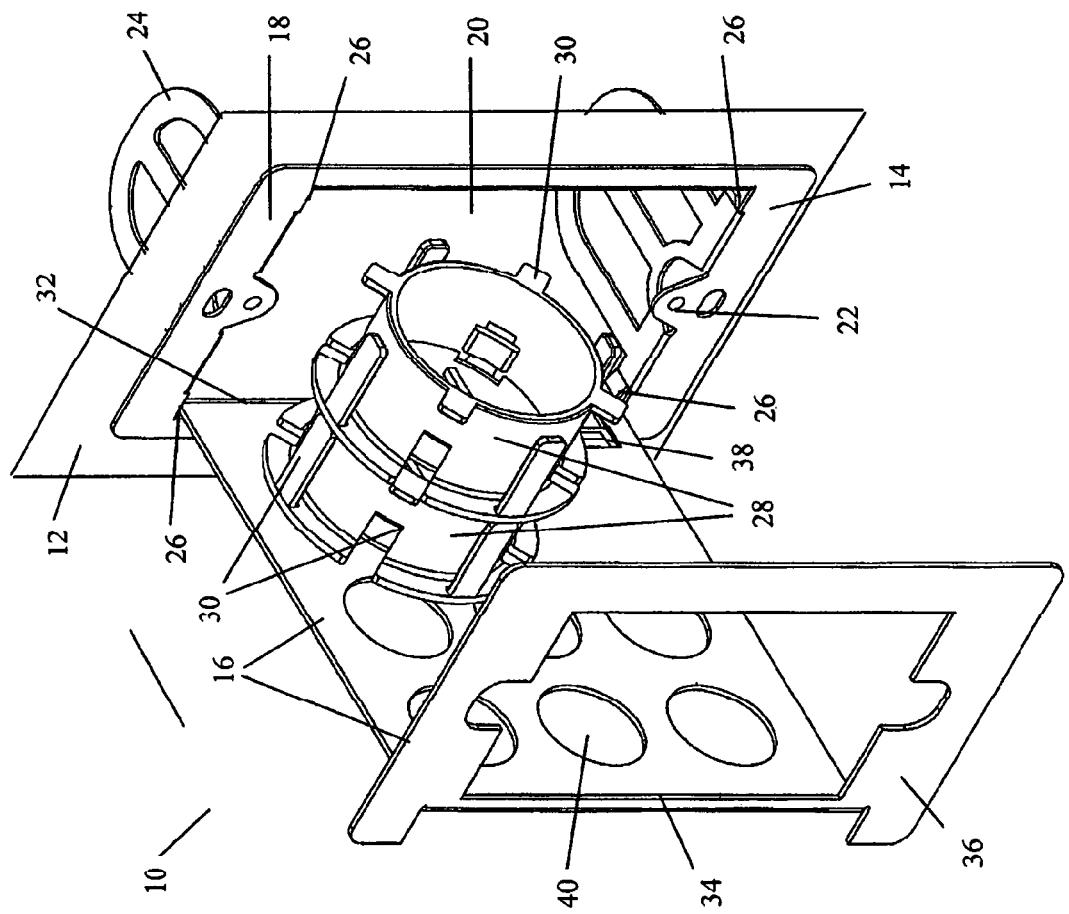
FIG. 2 is a perspective schematic view showing the work station outlet of FIG. 1 in a second illustrative position according to the present disclosure.

Referring to FIG. 2, according to an aspect of the present disclosure, the first plate 14 can be fabricated from a sufficiently rigid material, e.g., a polymer or metal. As shown, the first plate 14 defines a frame 18, which in turn defines an opening 20 for facilitating receipt/mounting of one or more cable coupling modules or receptacles (not shown). The frame 18 is provided with one or more wall mounting structures 22, e.g., fastener holes, and one or more stabilizing structures 24, e.g., wall engaging elements. Thus, the stabilizing structures 24, in an aspect of the present disclosure, can extend through an opening formed in the wall 12, and the first plate 14 secured in place by inserting mounting fasteners (not shown) through the mounting structures 22 and a corresponding hole in the wall 12 so as to engage the wall 12. The frame 18 defines one or more guide structures 26 suitable to accommodate the second plate 16 and allow the second plate 16 to slide and pivot relative to the first plate 14.

Figure 3:
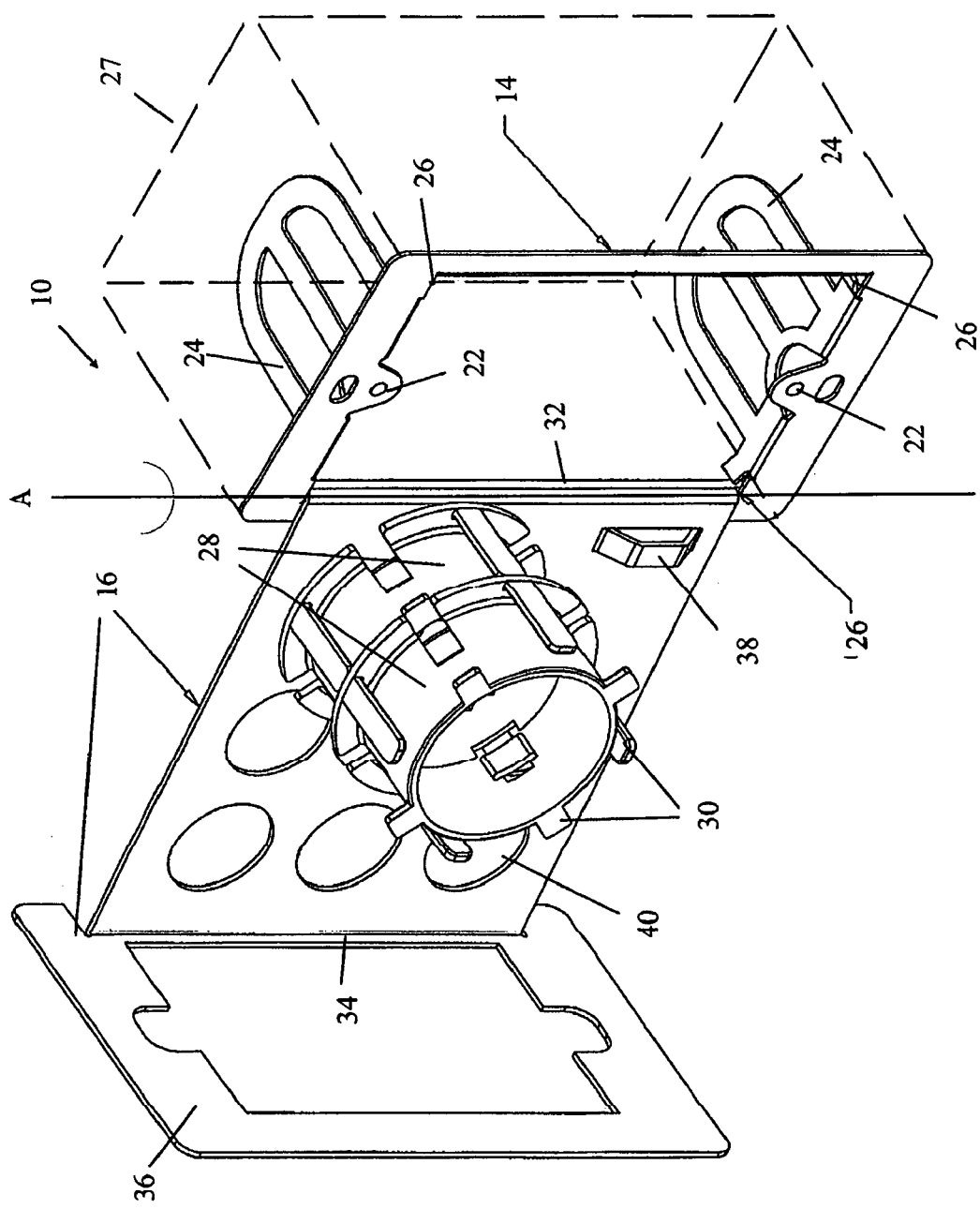
FIG. 3 is a perspective schematic view showing the work station outlet of FIG. 1 in a third illustrative position according to the present disclosure.

It is noted that the first plate 14 can have any of a variety of other structural features and/or configurations apparent to one skilled in the art. For example, as shown in FIG. 3, the first plate 14 may be operatively associated with a box 27 suitable for receiving and accommodating the second plate 16 to thereby provide an additional degree of protection for the second plate 16 and any other structure operatively associated with the second plate 16. The combined box 27 and first plate 14 preferably function in substantially the same manner as the first plate 14 does alone. The box 27, however, may beneficially be more suited for modular applications such as with furniture installations. The box 27 can have any of a variety of shapes, sizes and configurations suitable for effectively cooperating with the second plate 16. Accordingly, the box 27 and/or the first plate 14 can be effectively utilized in any of a variety of different installation applications including, for example, modular furniture installations, ceiling installations, floor installations, wire management raceway installations, etc.

Referring again to FIG. 2, the second plate 16, like the first plate 14, can be fabricated from a sufficiently rigid material, e.g., a polymer or metal. The second plate 16, as shown, is suitable to support one or more cable accommodating spools 28. Each spool 28 is preferably dimensioned so as to ensure that a prescribed minimum fiber optic cable bend radius is maintained, and includes cable retaining structures 30 that facilitate reducing or eliminating undesirable loose cable sags, cable snags or cable twists. For example, each spool 28 can have an outer surface radius of curvature of at least three-fourths of an inch (¾"), which is the minimum recommended radius for optical fiber curvature specified by the commonly used NEMA Spec.568A. Thus, when the optical fiber cable is wound about the spool 28, the radius of the optical fiber cable is not less than the recommended ¾". The retaining structures 30 preferably ensure that the optical fiber cable is firmly supported by the spool 28 so as to not slip or become entangled. Notwithstanding the foregoing example, it will be readily apparent to those skilled in the pertinent art from the present disclosure that each spool 28 and/or retaining structure 30 can have any of a variety of shapes, sizes and/or configurations suitable to effectively accommodate and/or otherwise manage various types of cable.

The second plate 16, in one aspect of the present disclosure, has at least two diametrically opposed edges, a first edge 32 and a second edge 34, configured to cooperate with the guide structures 26 of the first plate 14 so as to facilitate the second plate 16 sliding and pivoting with respect to the first plate 14. For example, the first edge 32, as best shown in FIG. 1, can be keyed so as to prevent the second plate 16 from inadvertently disengaging from the first plate 14 and moreover, to enable the second plate 16 to pivot relative to the first plate 14. Further, as also shown, the second edge 34 can be defined by a bend in the second plate 16 whereby a portion of the second plate 16 is bent to form a face plate 36. The face plate 36 preferably defines a frame and one or more openings complementary to those of the first plate 14. The bend differentiates the face plate 36 from the rest of the second plate 16 with a bend angle selected based on the desired orientation of the face plate 36 relative to the rest of the second plate 16. The bend angle, as shown, is preferably about 90° so that the face plate 36 is at least substantially perpendicular to the rest of the second plate 16. Thus, the second plate 16 with edges 32, 34 cooperates with the guide structures 26 of the first plate 14 to provide a drawer-like feature with respect to the wall 12 to which the work station outlet 10 is mounted, and thereby facilitate more effective, efficient and flexible cable installation and/or management.

As may be readily apparent to those skilled in the art, the second plate 16 can have any of a variety of other structural features suitable for facilitating effective and efficient cable management. For example, the second plate 16 can have one or more cable tie points 38 allowing the optical fiber cable or the like to be strain relieved as desired, such as by the jacket thereof. Further, the second plate 16 may be provided with one or more apertures 40 facilitating cable management and/or installation. Other structural features equally may be included and/or utilized.

Referring now to FIGS. 1 through 3, having identified and discussed various features of the work station outlet 10 according to the present disclosure, in use, the work station outlet 10 is operatively associated with the wall 12 via the first plate 14, which is mounted to the wall 12 so as to be substantially flush therewith and to allow the second plate 16, which is operatively associated with the first plate 14, to slide, preferably along a vertical plane, into and out from the wall 12 as desired between at least two positions. For example, with reference to FIG. 1, in a first or closed position, the second plate 16 is recessed into the wall 12 such that the first edge 32 is distanced from the first plate 14 and the second edge 34 and/or face plate 36 is proximate, preferably flush, and more preferably parallel with, the first plate 14. In this closed position, the spools 28 and any cable supported thereby, as well as any other cable management structure accommodated by the second plate 16, are protectively stored so as to prevent any inadvertent damage thereto. With reference now to FIG. 2, in a second or open position, the second plate 16 is withdrawn or pulled out from the wall 12 such that the first edge 32 is proximate the first plate 14 and the second edge 34 and/or face plate 36 is distanced from the first plate 14 and away from the wall 12. In this open position, the spools 28, cable, and any other cable management structure accommodated by the second plate 16 may be readily accessed and/or manipulated as desired so as to accomplish any of a variety of cable management operations (e.g., installing, guiding, adding/removing, adjusting, etc.). Further, as shown in FIG. 3, while in the open position, the second plate 16 is able to pivot, preferably about a vertical axis, through a predefined angle (e.g., about 90°) so as to provide greater access to the cable management structures accommodated by the second plate 16 and thereby operate as a "third hand" to assist in performing various cable management operations, and particularly in performing cable installations. Thus, the work station outlet design of the present disclosure facilitates effectively and efficiently accessing and/or manipulating optical fiber cables or the like not only in behind-the-wall installation applications as desired, but in any of a variety of other installation applications as will be apparent to those skilled in the pertinent art from the teachings herein.

Figure 4:
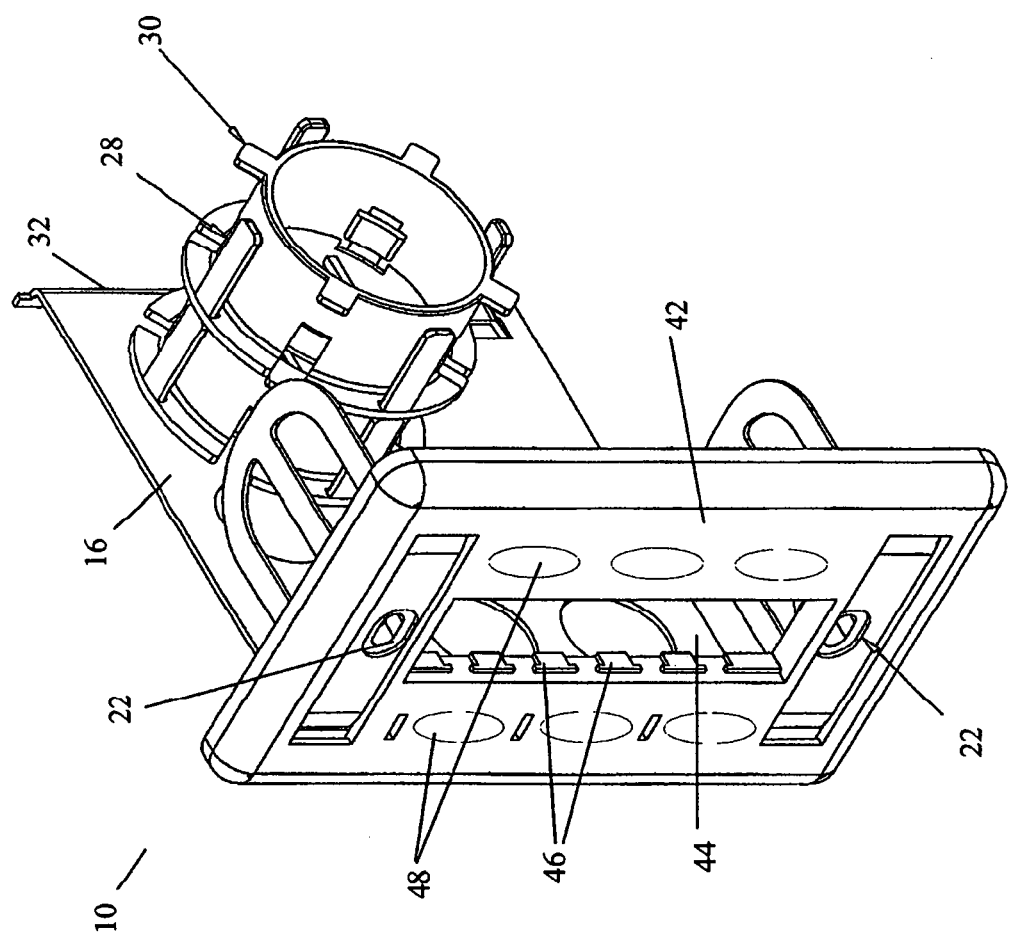
FIG. 4 is a perspective schematic view showing the work station outlet of FIG. 1 having an outlet cover operatively associated therewith.

Referring to FIG. 4, in another aspect of the present disclosure, the work station outlet 10 can include an outlet cover 42 operatively associated with the face plate of the second plate and the first plate adding aesthetic as well as functional features. For example, the outlet cover 42 can define one or more ports or receptacles 44 with an appropriate number of latching surfaces 46 and pre-printed indicia, e.g., port designations 48. Inclusion of appropriate indicia on such outlet cover facilitates accomplishing proper cable installation interconnections, while avoiding the hassle associated with subsequently identifying, labeling or otherwise defining appropriate indicia corresponding to the coupling arrangement provided by the work station outlet. The designations are typically arranged to match up with the receptacles and/or latch surfaces. Regions for mounting/adhering additional label-like information may also be provided according to the present disclosure, e.g., below the linearly aligned ports.

Figure 5:
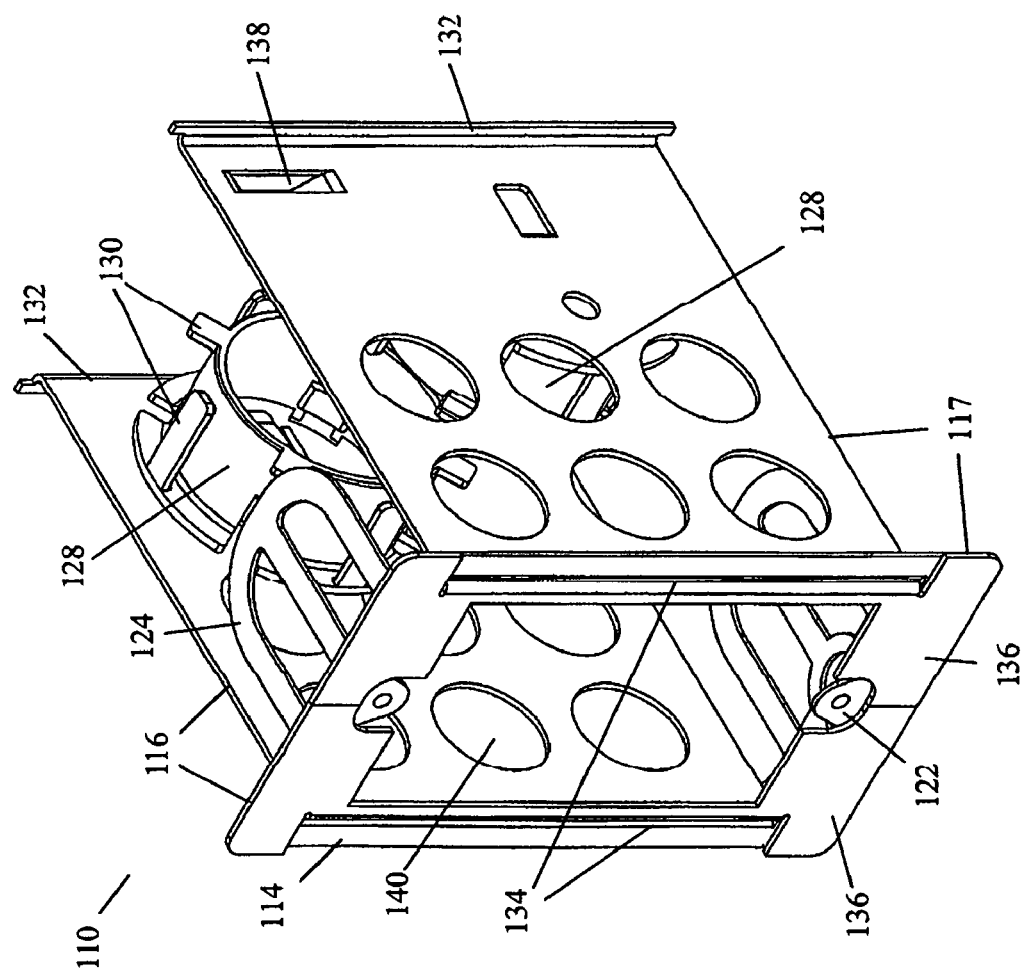
FIG. 5 is a perspective schematic view showing another exemplary work station outlet in a first illustrative position according to another aspect of the present disclosure.

Turning to FIG. 5, another exemplary work station outlet 110 according to the present disclosure is schematically depicted. The work station outlet 110 is similar to the work station outlet 10 described above, and therefore like reference numerals preceded by the numeral "1" are used to indicate like elements. The work station outlet 110 is distinct in that it includes a third plate 117 operatively connected to the first plate 114 so as to both slide and pivot relative to the first plate 114 and to thereby cooperate with the second plate 116 to provide a dual-drawer feature allowing efficient and effective access to one or more spools 128 operatively associated with the second plate 116 and/or the third plate 117.

The third plate 117, like the first and second plates 114, 116, can be fabricated from a sufficiently rigid material, e.g., a polymer or metal. The third plate 117 is suitable to support at least one spool 128 and has at least two diametrically opposed edges, a first edge 132 and a second edge 134, for cooperating with the guide structures 126 of the first plate 114 so as to facilitate the third plate 117 sliding and pivoting with respect to the first plate 114. Thus, as with the second plate 116, the first edge 132 is preferably keyed so as to prevent the third plate 117 from inadvertently disengaging from the first plate 114 and moreover, to enable the third plate 117 to pivot relative to the first plate 114. Again similar to the second plate 116, the second edge 134 may be defined by a bend in the third plate 117 whereby a portion of the third plate 117 is bent to form a face plate 136. The face plate 136 preferably defines a frame and one or more openings complementary to those of the first plate 114. The bend differentiates the face plate 136 from the rest of the third plate 117 with a bend angle selected based on the desired orientation of the face plate 136 relative to the rest of the third plate 117. The bend angle, as shown, is preferably about 90° so that the face plate 136 is at least substantially perpendicular to the rest of the third plate 117. Thus, the third plate 117 with edges 132, 134 cooperates with the guide structures 126 of the first plate 114 and the second plate 116 to provide a dual-drawer feature with respect to the wall to which the work station outlet is mounted, and thereby facilitate more effective, efficient and flexible cable installation and/or management.

As may be readily apparent to those skilled in the art, the third plate 117 can have any of a variety of other structural features suitable for facilitating effective and efficient cable management. That is, the third plate 117, like the second plate 116, can have one or more cable tie points 138 allowing the optical fiber cable to be strain relieved as desired, and one or more apertures 140 facilitating cable management and/or installation. Other structural features equally may be included and/or utilized.

Figure 6:
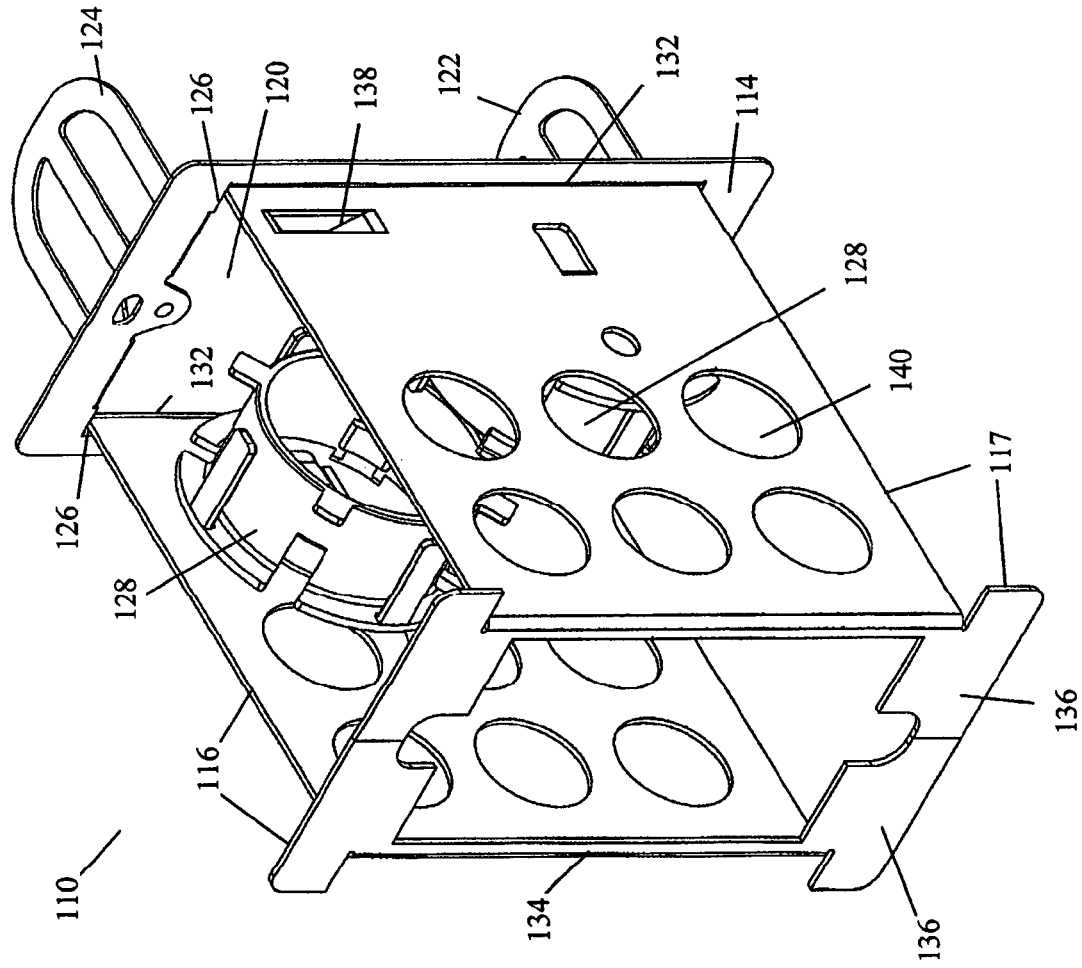
FIG. 6 is a perspective schematic view showing the work station outlet of FIG. 5 in a second illustrative position according to the present disclosure.
Figure 7:
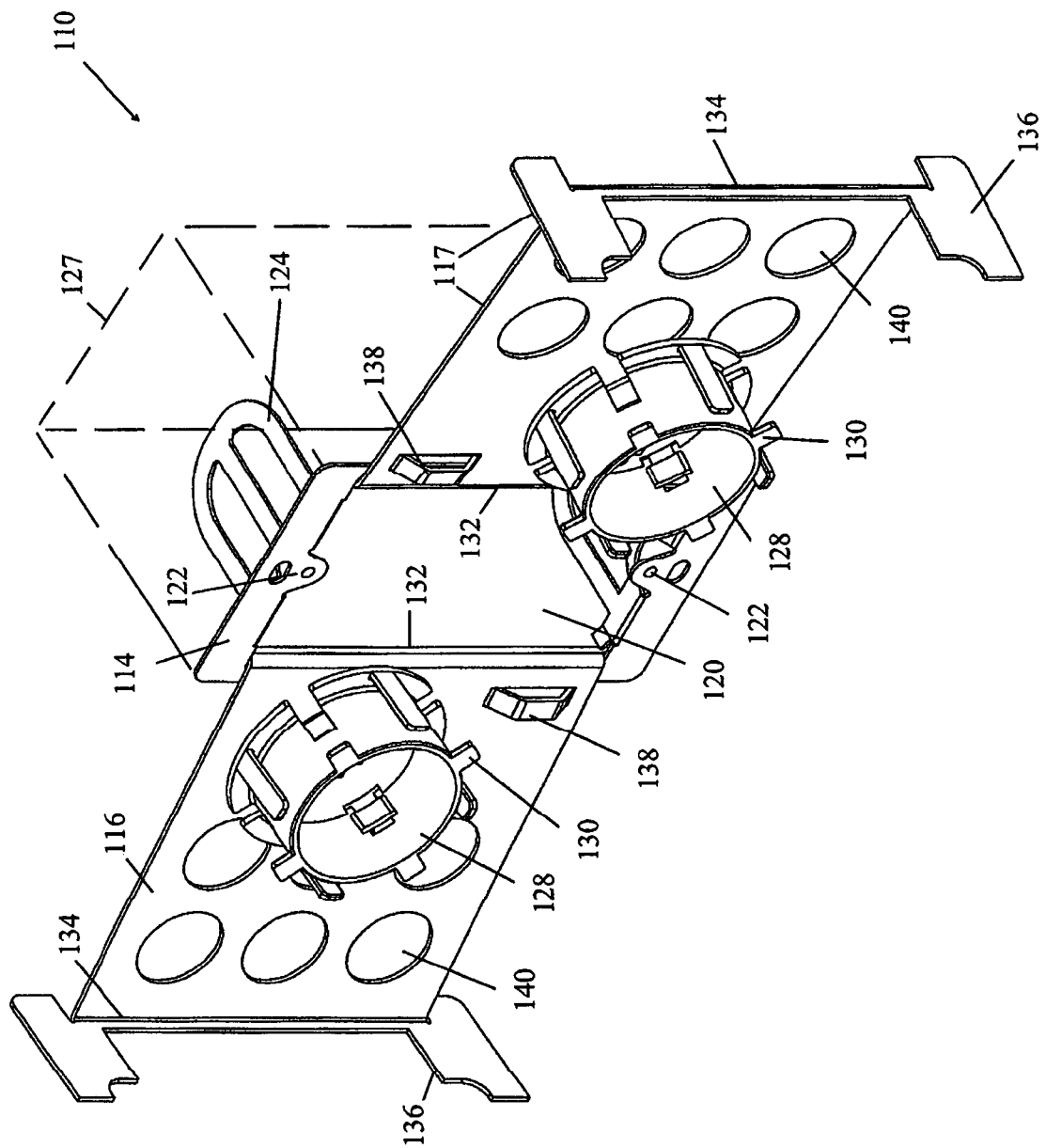
FIG. 7 is a perspective schematic view showing the work station outlet of FIG. 5 in a third illustrative position according to the present disclosure.

Referring now to FIGS. 5 through 7, having identified and discussed various features of the work station outlet 110 according to the present disclosure, in use, the work station outlet 110 may be operatively associated with a wall in a manner similar to that described above with respect to the work station outlet 10. That is, the first plate 114 may be mounted to the wall so as to be substantially flush therewith and to allow both the second plate 116 and the third plate 117, which are operatively associated with the first plate 114, to slide, preferably along two parallel vertical planes, into and out from the wall as desired between at least two positions. In a first or closed position, shown in FIG. 5, both the second plate 116 and the third plate 117 are recessed into the wall so that the first edges 132 thereof are distanced from the first plate 114 and the second edges 134 and/or face plates 136 thereof are proximate, preferably flush, and more preferably parallel with, the first plate 114. In this closed position, the respective face plates 136 of both the second plate 116 and the third plate 117 cooperate to cover the first plate 114. In addition, the spools 128 and any cable supported thereby, as well as any other cable management structure accommodated by the second plate 116 and/or the third plate 117, are protectively stored so as to prevent any inadvertent damage thereto. In a second or open position, the second plate 116 and/or the third plate 117 are withdrawn or pulled out from the wall such as, for example, shown in FIG. 6, where both the plates 116, 117 are withdrawn so that the respective first edges 132 thereof are proximate the first plate 114 and the second edges 134 and/or face plates 136 are distanced from the first plate 114 and away from the wall. In this open position, the spools 128, cable, and any other cable management structure accommodated by the second plate 116 and/or the third plate 117 can be readily accessed and/or manipulated as desired so as to accomplish any of a variety of cable management operations (e.g., installing, guiding, adding/removing, adjusting, etc.). As shown in FIG. 7, while in the open position, the second plate 116 and/or the third plate 117 are able to pivot, preferably about a vertical axis, through a predefined angle (e.g., about 90°) so as to provide greater access to the cable management structures accommodated by the second plate 116 and thereby operate as "third hands" to assist in performing various cable management operations, and particularly in performing cable installations. Thus, the dual-drawer work station outlet design of the present disclosure facilitates effectively and efficiently accessing and/or manipulating optical fiber cables in behind-the-wall installation applications as desired.

In use, the work station outlet of the present disclosure facilitates cable management and installation functions, while enhancing space utilization at and around the work station outlet. The work station outlet facilitates behind-the-wall cable routing and installation. The advantageous design of the disclosed plate elements and the enhanced functionalities that result from the design of such plate elements permit the work station outlet to be recessed relative to a wall and subsequently accessed as desired. By recessing the work station outlet behind a wall, several advantages may be realized including, but not limited to: (i) optimized working area in front of the wall during cable installation and/or subsequent cable additions or alterations, (ii) enhanced cable management functionality within the work station outlet by positioning and/or orienting cable management structures more effectively within the work station outlet, (iii) reduced likelihood of cable damage, and (iv) a cleaner, more aesthetic overall appearance with respect to the front of the wall.

Although the work station outlet of the present disclosure has been described with reference to exemplary aspects thereof, the present disclosure is not limited to such exemplary aspects. Rather, the present disclosure extends to and encompasses such modifications and/or enhancements that will be apparent to persons skilled in the art in view of the detailed description provided herein.

The invention claimed is:

1. A work station outlet comprising:
 a first plate for mounting said work station outlet to a wall, said first plate having at least one opening and at least one guide structure; and
 a second plate to facilitate accessing said work station outlet, said second plate having at least one cable management structure operatively associated therewith, said second plate being slidably coupled relative to said first plate in a substantially transverse manner via said at least one guide structure, and being pivotably coupled to said first plate about an axis defined by intersecting planes of said first plate and said second plate.

2. The work station outlet of claim 1, wherein said first plate defines a frame having wall mounting features.

3. The work station outlet of claim 2, wherein said guide structures are integral with said frame and adjacent said opening.

4. The work station outlet of claim 3, wherein said second plate defines a drawer.

5. The work station outlet of claim 4, wherein said second plate has a first edge that is keyed so as to prevent inadvertent disengagement of said second plate with respect to said first plate.

6. The work station outlet of claim 5, wherein said second plate has a second edge defined by a bend whereby a portion of said second plate is bent to form a face plate.

7. The work station outlet of claim 6, wherein said face plate comprises a frame having one or more openings complementary to those of said first plate.

8. The work station outlet of claim 6, wherein said second plate slides along a vertical plane between at least, a first position and a second position.

9. The work station outlet of claim 8, wherein said first edge is distal from said first plate and said second edge is proximate to said first plate when said second plate is in said first position, and wherein said first edge is proximate said first plate and said second edge is distal from said first plate when said second plate is in said second position.

10. The work station outlet of claim 8, wherein said second plate pivots about said vertical axis through an angle with respect to said first plate when in said second position.

11. The work station outlet of claim 10, wherein said angle is between about 0 degrees and about 90 degrees.

12. A method comprising:
 providing a work station outlet for cable management applications, said work station outlet comprising at least one cable management structure operatively associated therewith and further comprising means for accessing said at least one cable management structure;

mounting said work station outlet to a wall so as to facilitate said accessing of said at least one cable management structure; and installing at least one optical fiber cable utilizing said at least one cable management structure to route, couple or otherwise manipulate said at least one optical fiber cable to effectuate at least one communication transmission media connection.

13. The method of claim 12, wherein said means for selectively accessing said at least one cable management structure includes providing said working station outlet with a sliding and pivoting drawer suitable for accommodating said at least one cable management structure.

14. The method of claim 13, wherein said drawer is operatively associated with said work station outlet so as to be slidably received into and withdrawn from said wall along a vertical plane.

15. The method of claim 14, wherein said drawer can pivot about a vertical axis through a predefined angle when said drawer is withdrawn from said wall.

16. The method of claim 12, wherein said step of mounting said work station outlet to said wall includes utilizing a wall mounting plate.

17. A work station outlet for cable management comprising:
a mounting plate for mounting said work station outlet to a wall, said mounting plate defining at least one opening and a frame having one or more guide structures; and
a drawer assembly operatively associated with said mounting plate for accessing said work station outlet, said drawer assembly having at least one cable management structure operatively associated therewith and being slidably and pivotably connected to said mounting plate via said guide structures.

18. The work station outlet of claim 17, wherein said drawer assembly includes two independent and distinct drawers.

19. The work station outlet of claim 18, wherein said drawers each, independently slide along distinct, substantially parallel and laterally spaced vertical planes.

20. The work station outlet of claim 19, wherein said drawers each, independently pivot about distinct, substantially parallel and laterally spaced vertical axes.

21. An outlet comprising:
a plate having at least one opening; and
a drawer having a cable management structure operatively associated therewith;
said plate being mounted to a surface and coupled to said drawer such that at an initial position, said plate and said drawer are oriented along approximately transverse planes to each other; and
upon translational and pivotal movement of said drawer to a final position relative to said plate, said plate and said drawer are oriented along approximately parallel planes to each other.

22. The outlet of claim 21, wherein said plate further comprises at least one aperture to facilitate affixing said plate to said surface.

23. The outlet of claim 21, wherein said pivotal movement of said drawer occurs along an axis formed by an intersection between a plane of said plate and a plane of said drawer.

24. The outlet of claim 23, wherein said plate further comprises a guide structure adapted to guide said translational movement of said drawer relative to said plate.

25. The outlet of claim 21, wherein said drawer further comprises a face plate oriented generally transversely to said drawer.

26. The outlet of claim 21, wherein said drawer comprises a first drawer, and said outlet comprises a second drawer, said second drawer being coupled to said plate.

27. The outlet of claim 26, wherein said second drawer is coupled to said plate such that at a first position, said plate and said second drawer are oriented along approximately transverse planes to each other; and
upon translational and pivotal movement of said second drawer to a second position relative to said plate, said plate and said second drawer are oriented along approximately parallel planes to each other.

28. The outlet of claim 21, further comprising an outlet cover oriented approximately parallel to said plate and operatively connected therewith.

29. A method comprising:
providing an outlet for cable management applications, said outlet comprising a first plate having an opening therethrough, said first plate being pivotally and translationally coupled to a second plate at said opening, said second plate having a cable management structure thereon;

mounting said outlet to a surface by affixing said first plate to said surface, wherein said first plate is oriented generally transversally to said second plate, and said second plate is oriented substantially behind said surface;

sliding said second plate relative to said first plate out from behind said surface along a plane of said second plate;

rotating said second plate toward a plane of said first plate; and manipulating a cable against said cable management structure on said second plate.

30. The method of claim 29, wherein mounting said outlet to said surface comprises mounting said outlet to a wall.

31. The method of claim 30, wherein mounting said outlet to said surface comprises advancing a fastener through said first plate into said surface.

32. The method of claim 29, wherein said outlet further comprises a third plate pivotally and translationally coupled to said opening of said first plate; and
said method further comprises sliding and pivoting said third plate relative to said first plate.

* * * * *